Patented Sept. 29, 1936

2,055,617

UNITED STATES PATENT OFFICE 2,055,617

PRODUCTION OF OXALYL CHLORIDE

Peter J. Wiezevich, Elizabeth, N. J., assignor to Standard Oil Development Company, a corporation of Delaware No Drawing. Application June 23, 1931, Serial No. 546,423

18 Claims. (Cl. 260—123)

This invention relates to improvements in the preparation of oxalyl chloride.

When carbon monoxide and chlorine are caused to react at atmospheric pressure and moderate temperatures, phosgene is the resulting product. This process is utilized commercially for the preparation of this compound. The invention herein described causes the above reaction to take place under such conditions as to cause the formation of oxalyl chloride. In this case one mol. of chlorine reacts with two mols of carbon monoxide, while in the ordinary process for the preparation of phosgene, one mol. of chlorine unites with only one mol. of carbon monoxide.

With a preferred embodiment in mind, but without intention to limit the invention more than is required by the prior art, the process comprises subjecting carbon monoxide and chlorine, or substances consisting of carbon monoxide and chlorine (such as phosgene), to a moderately high temperature and pressure (substantially above atmospheric). A catalyst such as those used for the preparation of phosgene may be employed for the reaction, such material being charcoal, pumice, a hydrogen halide such as hydrogen chloride, bromide, or iodide, or a metallic halide such as cuprous chloride, bismuth trichloride, aluminum chloride, or the like. The reaction is carried out preferably with excess of carbon monoxide, and under a pressure of approximately 200 atmospheres. The temperature may range between approximately 200 and 400° C.

By way of example, carbon monoxide in excess is treated with chlorine in the presence of charcoal at a temperature of approximately 200° C. and under a pressure of approximately 200 atmospheres. Oxalyl chloride is formed as a result of the reaction and is separated from the resulting mixture after cooling same; the remaining gases are recirculated through the heated zone.

In ordinary methods of preparing phosgene, chlorine and approximately 25% excess carbon monoxide are caused to react at atmospheric pressure with the resultant formation of phosgene. In one form of carrying out my invention, phosgene and carbon monoxide are caused to react under greater than atmospheric pressure preferably in the presence of a solvent inert to the reaction which may contain a suitable catalyst for the reaction. The inert solvent may be a chlorinated compound such as chlorobenzene, acetylene tetrachloride, or the like. The catalyst for the reaction can be a metal salt such as copper chloride, sulfur chloride, aluminum chloride or the like. As a result of this treatment two molecules of carbon monoxide are caused to react with one molecule of chlorine, thereby forming the oxalyl chloride.

The oxalyl chloride is a colorless liquid which boils at about 65° C. It is related to oxalic acid as acetyl chloride is related to acetic acid. The oxalyl chloride reacts readily with alcohols to yield the corresponding esters. For example, oxalyl chloride when treated with ethyl alcohol at atmospheric pressure and at slightly elevated temperature yields diethyl oxalate.

Various changes may be made within the scope of the appended claims in which it is desired to claim all novelty inherent in the invention as broadly as the prior art permits.

I claim:

1. The process of producing oxalyl chloride, which comprises heating a chlorine-containing substance of the class of chlorine and phosgene, capable of reacting with carbon monoxide to form oxalyl chloride at about 200 atmospheres pressure, with at least the molecular equivalent amount of carbon monoxide required to form oxalyl chloride.

2. Process according to claim 1, carried out in the presence of a chlorinating catalyst effective in promoting reaction of the chlorine-containing substance with carbon monoxide to form oxalyl chloride.

3. Process according to claim 1, carried out in the presence of a catalyst of the group consisting of active solid granular, porous absorbents.

4. Process according to claim 1, carried out in the presence of a charcoal catalyst.

5. Process according to claim 1, in which an inert solvent is employed.

6. Process according to claim 1, in which chlorine is used as the chlorine-containing substance.

7. Process according to claim 1, in which phosgene is used as the chlorine-containing substance.

8. Process according to claim 1, which is carried out at a temperature between the approximate limits of 200° and 400° C.

9. A process according to claim 1, in which a catalyst of the kind used for the preparation of phosgene is employed.

10. The process of producing oxalyl chloride, which consists in heating carbon monoxide with a chlorine-containing substance of the class of chlorine and phosgene, capable of reacting with carbon monoxide to form oxalyl chloride, under a pressure in the neighborhood of 200 atmospheres.

11. The process of producing oxalyl chloride, which comprises heating carbon monoxide with chlorine at a pressure of approximately 200 atmospheres.

12. Process according to claim 11, carried out in the presence of a catalyst effective in promoting reaction of chlorine with carbon monoxide to form oxalyl chloride.

13. Process according to claim 11, carried out in the presence of a catalyst of the group consisting of active inorganic halides.

14. Process according to claim 11, carried out in the presence of a charcoal catalyst.

15. Process according to claim 11, carried out at a temperature between the approximate limits of 200° and 400° C.

16. Process according to claim 11, in which an inert solvent is employed.

17. The process of producing oxalyl chloride, which comprises heating at least two mols of carbon monoxide with one mol. of chlorine to a reaction temperature at a pressure in the neighborhood of 200 atmospheres.

18. The process of producing oxalyl chloride which comprises reacting at least two mols of carbon monoxide with one mol. of chlorine at a temperature between the approximate limits of 200° and 400° C. at a pressure of approximately 200 atmospheres and in the presence of a catalyst of the group consisting of active inorganic halides.

PETER J. WIEZEVICH.